(12) United States Patent
Kamiya et al.

(10) Patent No.: US 9,302,445 B2
(45) Date of Patent: Apr. 5, 2016

(54) FIBER-REINFORCED COMPOSITE MATERIAL

(75) Inventors: Ryuta Kamiya, Kariya (JP); Ryohei Tsuji, Kariya (JP); Shun Kuno, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 119 days.

(21) Appl. No.: 14/234,314

(22) PCT Filed: May 10, 2012

(86) PCT No.: PCT/JP2012/061966
§ 371 (c)(1),
(2), (4) Date: Jan. 22, 2014

(87) PCT Pub. No.: WO2013/014992
PCT Pub. Date: Jan. 31, 2013

(65) Prior Publication Data
US 2014/0170371 A1    Jun. 19, 2014

(30) Foreign Application Priority Data

Jul. 27, 2011    (JP) ................... 2011-164445

(51) Int. Cl.
*B32B 5/12*    (2006.01)
*B29C 70/34*    (2006.01)
(Continued)

(52) U.S. Cl.
CPC ............ *B32B 5/12* (2013.01); *B29C 70/222* (2013.01); *B29C 70/228* (2013.01); *B29C 70/34* (2013.01);
(Continued)

(58) Field of Classification Search
CPC ........ B29C 70/228; B29C 70/222; B32B 5/12
USPC ........................................ 428/105, 108, 113
See application file for complete search history.

(56) References Cited

U.S. PATENT DOCUMENTS

2003/0175520 A1    9/2003    Grutta et al.
2009/0233044 A1    9/2009    Sun et al.
(Continued)

FOREIGN PATENT DOCUMENTS

CN    EP 2100719 A1 *   9/2009    ........ B29C 45/14811
EP    2100719 A1    9/2009
(Continued)

OTHER PUBLICATIONS

International Preliminary Report on Patentability, dated Jan. 28, 2014, issued by the International Searching Authority, in counterpart Application No. PCT/JP2012/061966.
(Continued)

*Primary Examiner* — Brent O'Hern
(74) *Attorney, Agent, or Firm* — Sughrue Mion, PLLC

(57) ABSTRACT

A fiber-reinforced composite material (11) is constructed by laminating a plurality of fiber bundle layers formed of a reinforced fiber to form a laminated fiber bundle layer and further impregnating the laminated fiber bundle layer with a matrix. At either side of a neutral surface (16), the number of +θ layers which are fiber bundle layers having a fiber orientation angle of +θ and the number of −θ layers which are fiber bundle layers having a fiber orientation angle of −θ are the same, the order of laminating the fiber bundle layers is inversely symmetrical with respect to the standard surface, and the number of other fiber bundle layers disposed between the +θ and −θ layers at either side of the standard surface is the same.

8 Claims, 4 Drawing Sheets

(51) Int. Cl.
*B29C 70/22* (2006.01)
*B32B 5/02* (2006.01)
*B64C 1/06* (2006.01)
*B64C 1/12* (2006.01)
*B64C 3/18* (2006.01)
*B64C 3/20* (2006.01)
*B64C 3/26* (2006.01)
*B29K 105/08* (2006.01)
*B64C 1/00* (2006.01)

(52) U.S. Cl.
CPC ............... *B32B 5/024* (2013.01); *B64C 1/064* (2013.01); *B64C 1/12* (2013.01); *B64C 3/182* (2013.01); *B64C 3/20* (2013.01); *B64C 3/26* (2013.01); *B29K 2105/089* (2013.01); *B32B 2250/40* (2013.01); *B32B 2260/023* (2013.01); *B32B 2260/046* (2013.01); *B32B 2262/02* (2013.01); *B32B 2262/106* (2013.01); *B32B 2305/076* (2013.01); *B32B 2605/18* (2013.01); *B64C 2001/0072* (2013.01); *Y10T 156/1044* (2015.01); *Y10T 428/24124* (2015.01)

(56) References Cited

U.S. PATENT DOCUMENTS

| | | | |
|---|---|---|---|
| 2010/0028616 | A1 | 2/2010 | Yamanouchi et al. |
| 2011/0064908 | A1* | 3/2011 | Kweder ............ B29B 11/16 428/113 |

FOREIGN PATENT DOCUMENTS

| | | | |
|---|---|---|---|
| JP | 63-36060 | Y2 | 9/1988 |
| JP | 9-1713 | A | 1/1997 |
| JP | 2002-307590 | A | 10/2002 |
| JP | 2004-346190 | A | 12/2004 |
| JP | 2008-37258 | A | 2/2008 |
| JP | 2009-191186 | A | 8/2009 |
| WO | 03/078164 | A1 | 9/2003 |
| WO | 2008/038429 | A1 | 4/2008 |

OTHER PUBLICATIONS

Communication dated Feb. 27, 2015 from the European Patent Office in counterpart application No. 12817028.9.

* cited by examiner

Fig.3(a)
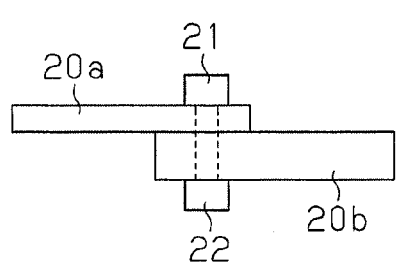
Fig.3(b)
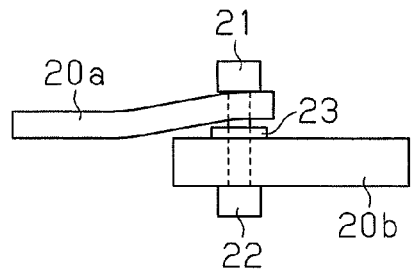
Fig.4(a)
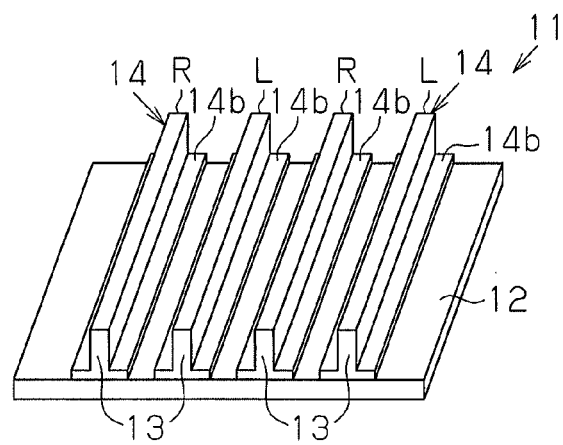
Fig.4(b)
Fig.4(c)
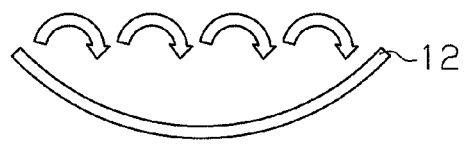
Fig.4(d)
R  Neutral surface
+45/90/−45/0 | 0/+45/90/−45
L  Neutral surface
−45/90/+45/0 | 0/−45/90/+45

FIBER-REINFORCED COMPOSITE MATERIAL

CROSS REFERENCE TO RELATED APPLICATIONS

This application is a National Stage of International Application No. PCT/JP2012/061966, filed on May 10, 2012, which claims priority from Japanese Patent Application No. 2011-164445, filed on Jul. 27, 2011, the contents of all of which are incorporated herein by reference in their entirety.

FIELD OF THE INVENTION

The present invention relates to a fiber-reinforced composite material constructed by combining a laminated fiber bundle layer and a matrix.

BACKGROUND OF THE INVENTION

Fiber-reinforced composite materials are used as lightweight, high-strength materials. A fiber-reinforced composite material is constructed by combining reinforced fibers and a matrix of resin, metal or the like. Therefore, the kinetic properties (mechanical properties) of the fiber-reinforced composite material are improved more than those of the matrix. Hence, the fiber-reinforced composite material is suitable for structural components such as fuselages and wings of aircraft. Especially, the use of a resin as the matrix can further decrease the weight of the fiber-reinforced composite material. In particular, in applications in which high performance is required, a laminated reinforcing material formed by laminating a plurality of fiber bundle layers formed of fibers arrayed in one direction is used. In this case, the plurality of fiber bundle layers function as a reinforced fiber base material, and are respectively laminated in different array directions of the respective fiber bundle layers.

The following countermeasures have been carried out or proposed against warpage (bending and torsion) of fiber-reinforced composite materials employing a laminated reinforcing material.

(1) Laminated structures are made symmetrical in order to cancel the moment generated.

(2) A mold is made in expectation of the amount of warpage to bring the form after deformation within the accuracy required.

(3) The laminated reinforcing material is reheated and compressed after molding for correction of warpage.

(4) Fibers having different torsional moments are used to constitute a fabric, thereby cancelling the moment generated (for example, see Patent Document 1).

Without relation to the countermeasures against warpage, a fiber-reinforced laminated structure as disclosed in Patent Document 2 has also been proposed. According to the invention disclosed in this document, the thickness of an isotropic composite material can be decreased as compared with the case where a plurality of fiber sheets are laminated while the fiber orientation angle is changed by 15°, 30°, 45° or 90°. In this case, the fiber orientation angle θ between adjacent fiber sheets among the laminated fiber sheets is 60°<θ<90°. Inversely symmetrical cases as shown in the following table are also indicated as examples of the lamination pattern. The phrase "inversely symmetrical" refers to the case where the positivity and negativity of the lamination pattern are inverse at both sides of a standard surface. In Table 1, the standard surface is a surface on which a fiber sheet having a lamination pattern of 0° is disposed.

TABLE 1

| Number of fiber sheets laminated | Fiber orientation angle | Lamination pattern |
|---|---|---|
| 5 | 72° | −36/72/0/−72/36 |
| 7 | 26° | −77/−51/−26/0/26/51/77 |
| 7 | 51° | 26/77/−51/0/51/−77/−26 |
| 7 | 77° | −51/26/−77/0/77/−26/51 |
| 9 | 80° | −20/60/−40/80/0/−80/40/−60/20 |

The above prior art involves the following problems.

In the case (1), when the fiber-reinforced composite material has a complicated form, not a flat-plate like form or a form obtained merely by bending a flat plate, there exists a site in which no symmetrical laminated layer can be constructed. FIG. 8(a) shows a fiber-reinforced composite material 51 of a skin-web structure composed of three sets of symmetrical laminated sheets 52. According to this configuration, two symmetrical laminated sheets 52 are respectively bent to constitute a skin part 53 and a web part 54. As shown in FIG. 8(b), when the fiber orientation angles of the fiber bundle layers constituting the respective symmetrical laminated sheets 52 are defined as 0°, 90° and ±45°, the left and right sides of a neutral surface near the web part 54 are not symmetrical. FIG. 8(c) shows the case where the same symbols are used for the layers having a fiber orientation angle of 45° as the uppermost layers in the skin parts 53 of the symmetrical laminated sheets 52 disposed at the left and right sides, respectively. As shown in FIG. 8(c), the symbols for the layers having a fiber orientation angle of 45° of the respective symmetrical laminated sheets 52 are opposite with respect to the facing surfaces of the left-side symmetrical laminated sheet 52 and right-side symmetrical laminated sheet 52 as the border. As a result, torsion occurs in the fiber-reinforced composite material 51.

In the case (2), trial production for obtaining data on the amount of warpage is required, which increases the production cost and number of steps.

In the case (3), correcting steps are additionally required after molding, which increases the production cost.

In the case (4), since commercial unidirectional materials or fabrics cannot deal with the problem, the cost for materials is increased.

Also, a configuration in which fiber sheets are laminated in the state where the fiber orientation angles are merely inversely symmetrical as in Patent Document 2 cannot reduce torsion.

PRIOR ART DOCUMENT

Patent Document

Patent Document 1: Japanese utility model publication No. 63-36060
Patent Document 2: Japanese Laid-Open Patent Publication No. 9-1713

SUMMARY OF THE INVENTION

An object of the present invention is to provide a fiber-reinforced composite material which can reduce warpage without carrying out any special production process, even when the material has a complicated form such as a skin-web structure.

In order to solve the above problem, according to a first aspect of the present invention, there is provided a fiber-reinforced composite material constructed by impregnating a laminated fiber bundle layer formed by laminating a plurality of fiber bundle layers formed of reinforced fibers with a matrix. In this fiber-reinforced composite material, at either side of a standard surface, the number of +θ layers which are fiber bundle layers having a fiber orientation angle of +θ and the number of −θ layers which are fiber bundle layers having a fiber orientation angle of −θ are the same. The order of laminating the fiber bundle layers is inversely symmetrical with respect to a standard surface, and the number of other fiber bundle layers disposed between the +θ and −θ layers at either side of the standard surface is the same.

According to this configuration, the fiber bundle layers which have a fiber orientation angle of −θ and the fiber bundle layers which have a fiber orientation angle of +θ are disposed in such a manner that they are inversely symmetrical with respect to a standard surface as the border and satisfy the above conditions. This causes cancellation of torsional moment due to the −θ layers and +θ layers in the state of a fiber-reinforced composite material, so that the entire synthetic moment is reduced. Thus, even in the case of a fiber-reinforced composite material having a complicated form such as a skin-web structure, the warpage of the fiber-reinforced composite material can be reduced without carrying out any special production process. Specifically, it is unnecessary to make a mold in expectation of warpage or deformation, to correct warpage by reheating and compression after molding, or to make a fabric from fibers having different torsional moments. Here, the "standard surface" is a surface virtually existing between any fiber bundle layers of a laminated fiber bundle layer. When the laminated fiber bundle layer has a rectangular shape, the "fiber orientation angle" refers to an angle with respect to the longitudinal direction of the laminated fiber bundle layer.

In the above-described fiber-reinforced composite material, the numbers of the +θ layers and −θ layers existing at either side of the standard surface are respectively two, and, as the order of laminating the fiber bundle layers, preferably, two −θ layers are disposed between two +θ layers at one side of the standard surface, and two +θ layers are disposed between two −θ layers at the other side thereof.

According to this configuration, it is hard to mistake the order of laminating the +θ layers and −θ layers when laminating the fiber bundle layers.

In the above-described fiber-reinforced composite material, θ is preferably 45°.

According to this configuration, a quasi-isotropic fiber-reinforced composite material can be easily obtained by using a fiber bundle layer having a fiber orientation angle of 0° or 90° in addition to a fiber bundle layer having a fiber orientation angle of +45° or −45°.

In the above-described fiber-reinforced composite material, the +θ layers constitute one set of two layers, i.e., a fiber bundle layer having a fiber orientation angle of +36° and a fiber bundle layer having a fiber orientation angle of +72°, and the −θ layers constitute one set of two layers, i.e., a fiber bundle layer having a fiber orientation angle of −36° and a fiber bundle layer having a fiber orientation angle of −72°.

According to this configuration, a quasi-isotropic laminated fiber bundle layer is composed of five fiber bundle layers (the above-described four layers plus a fiber bundle layer having a fiber orientation angle of 0°) laminated at 36° pitches as one unit. In this case, two units can be disposed at either side of the standard surface, thereby constituting a quasi-isotropic laminated fiber bundle layer having an inversely symmetrical structure. Also, in this case, the fiber bundle layer having a fiber orientation angle of +36° and fiber bundle layer having a fiber orientation angle of +72° are collectively defined as +θ fiber bundle layers, and the fiber bundle layer having a fiber orientation angle of −36° and fiber bundle layer having a fiber orientation angle of −72° are collectively defined as −θ fiber bundle layers, thereby providing a similar effect to that obtained by the above-described configuration.

In the above-described fiber-reinforced composite material, the fiber-reinforced composite material preferably constitutes a structure having a flat-plate like skin and one or more webs extending vertically to the skin.

In general, a T-shaped structure in which one of the flat surfaces of a flat plate having two flat surfaces extends vertically to the other flat surface is referred to as a "skin-web structure." The number of webs existing to the skin is not limited to one, and may be plural. According to this configuration, the warpage of the skin part and web part can be reduced even in the case of a fiber-reinforced composite material having a complicated form, such as the skin-web structure, used in fuselages and wings of aircraft.

In the above-described fiber-reinforced composite material, the fiber bundle layers are preferably composed of a unidirectional fabric.

When a laminated fiber bundle layer which has an inversely symmetrical structure and is quasi-isotropic is constructed, the warp yarn group and weft yarn group of common plain weave fabrics cannot be used in place of the fiber bundle layer having a fiber orientation angle of +θ and fiber bundle layer having a fiber orientation angle of −θ. On the one hand, the warp yarn group and weft yarn group of common plain weave fabrics can be used in place of the fiber bundle layer having a fiber orientation angle of 0° or 90°. However, when the warp yarn group and weft yarn group of plain weave fabrics are used in place of the fiber bundle layers, reinforced fibers bend at the crossing parts. In this regard, according to the present invention, all fiber bundle layers are composed of unidirectional fabrics. Therefore, the reinforced fibers bend at the crossing parts in a reduced proportion, so that the physical properties of the finally-obtained fiber-reinforced composite material improve. Here, the phrase "unidirectional fabric" means a fabric of which the warp yarn functions as reinforced fibers and the weft yarn functions to keep the array of the warp yarn, but does not function as reinforced fibers.

In the above-described fiber-reinforced composite material, the other fiber bundle layers are fiber bundle layers having a fiber orientation angle of 0° or 90°, and the fiber bundle layers having a fiber orientation angle of 0° or 90° are preferably composed of a plain weave fabric or twill fabric.

In order to solve the above problem, according to a second aspect of the present invention, there is provided a process for producing the above-described fiber-reinforced composite material. This production process comprises the steps of: impregnating a fiber bundle arrayed in one direction with a thermosetting resin to form a plurality of prepregs in a semi-hardened state; laminating the plurality of prepregs to form a laminated fiber bundle layer; forming the laminated fiber bundle layer into a predetermined shape; disposing the formed laminated fiber bundle layer within a shaping mold; and heating and pressurizing the laminated fiber bundle layer within the shaping mold to harden the layer.

BRIEF DESCRIPTION OF THE DRAWINGS

FIG. 3(a) is a schematic diagram showing a fastened state of the fiber-reinforced composite material which is not warped;

FIG. 3(b) is a schematic diagram showing a fastened state of the fiber-reinforced composite material which is warped;

FIG. 4(a) is a perspective view showing a fiber-reinforced composite material according to a second embodiment of the present invention;

FIG. 4(b) is a schematic diagram showing the deformation of a skin part;

FIG. 4(c) is a schematic diagram showing the deformation of a skin part of a comparative example;

FIG. 4(d) is a schematic diagram showing the laminated configuration of laminated fiber bundle layers in a web part designated by R and a web part designated by L;

DETAILED DESCRIPTION OF THE PREFERRED EMBODIMENTS

First Embodiment

Figure 1:
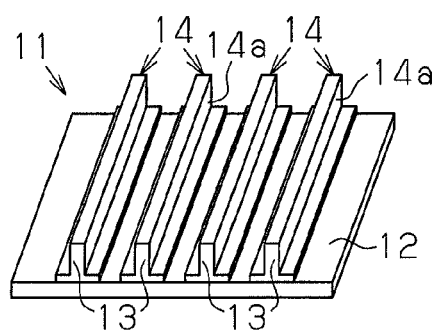
FIG. 1(a) is a perspective view showing a fiber-reinforced composite material according to a first embodiment of the present invention.
FIG. 1(b) is a perspective view showing a reinforcing part.
FIG. 1(c) is a schematic diagram showing the laminated configuration of a laminated fiber bundle layer in a web part.
Figure 1:
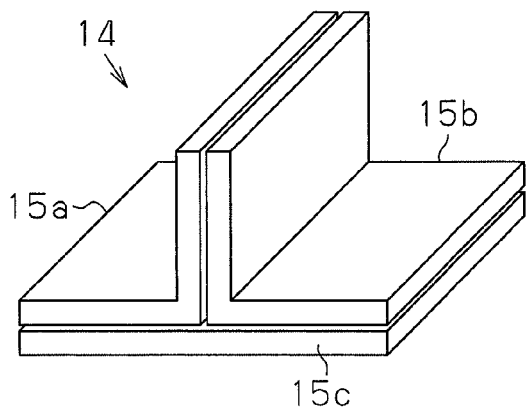
Figure 1:
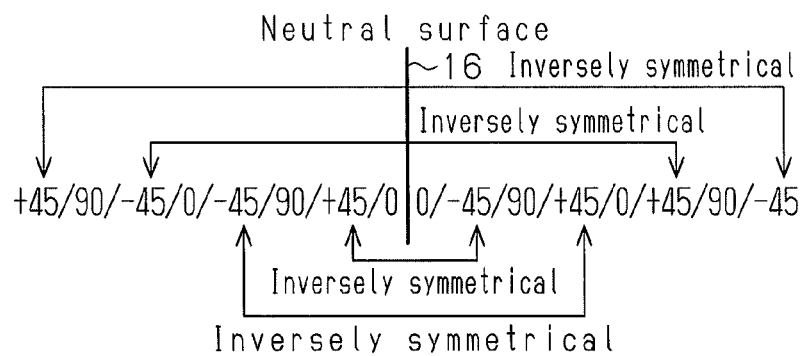

Hereinafter, a first embodiment in which the present invention has been embodied into a fiber-reinforced composite material having a skin-web structure will be explained in accordance with FIGS. 1(a) to 3(b).

As shown in FIG. 1(a), a fiber-reinforced composite material 11 has a skin part 12 and a web part 13. The skin part 12 is formed into a flat-plate shape. A reinforcing part 14 having an inverted T-cross section is integrated with the skin part 12. The reinforcing part 14 has a web part 14a constituting the web part 13. Specifically, the fiber-reinforced composite material 11 has a flat-plate like skin and one or more web(s) extending vertically to the skin.

The fiber-reinforced composite material 11 is constructed by laminating a plurality of fiber bundle layers formed of reinforced fibers to form a laminated fiber bundle layer, and further impregnating the laminated fiber bundle layer with a matrix. Here, four types of fiber bundle layers having fiber orientation angles of 0°, 90° and ±45°, respectively, are laminated so that a tetra-axially oriented, laminated fiber bundle layer having quasi-isotropy is constructed.

In general, the sentence that "a laminated fiber bundle layer has quasi-isotropy" means the case where the total number of layers is three or more, the orientation angle $Q_k$ of the kth layer in the n layers satisfies $Q_k = \pi(k-1)/n$ (k: kth layer; and n: total number of layers), and the same fibers are used in all the layers. When n is 4, the orientation angle of the first layer is $\pi(1-1)/4 = 0°$, the orientation angle of the second layer is $\pi(2-1)/4 = \pi/4 = 45°$, and the orientation angle of the third layer is $\pi(3-1)/4 = \pi/2 = 90°$ and the orientation angle of the fourth layer is $\pi(4-1)/4 = 3\pi/4 = 135° = -45°$.

As a fiber bundle, a carbon fiber bundle is used. One fiber bundle is composed of from several hundreds to tens of thousands of fine fibers bundled. Fibers in a number suitable for the performance required are used in the fiber bundle.

As shown in FIG. 1(b), the reinforced fibers constituting the reinforcing part 14 are composed of laminated fiber bundle layers 15a, 15b bent in a L shape and one set of flat-plate like laminated fiber bundle layer 15c. The respective laminated fiber bundle layers 15a, 15b, 15c are constructed by laminating a plurality of fiber bundle layers in such a manner that the laminated fiber bundle layers have quasi-isotropy. FIG. 1(c) shows the laminated configuration of the web part 14a, namely, a portion composed of a rising part of the laminated fiber bundle layer 15a and a rising part of the laminated fiber bundle layer 15b. As shown in FIG. 1(c), in the fiber bundle layers disposed at one side of a neutral surface 16 which is a standard surface (left side in FIG. 1(c)), the fiber orientation angles are set to be 0°, 45°, 90°, −45°, 0°, −45°, 90° and 45°, respectively, in order from the neutral surface 16. Also, in the fiber bundle layers disposed at the other side of the neutral surface 16 (right side in FIG. 1(c)), the fiber orientation angles are set to be 0°, −45°, 90°, 45°, 0°, 45°, 90° and −45°, respectively.

The laminated configuration of the fiber bundle layers has an inversely symmetrical structure with respect to the fiber orientation angles. Specifically, the number of fiber bundle layers which have a fiber orientation angle of +θ (45°) and the number of fiber bundle layers which have a fiber orientation angle of −θ (−45°) are the same, at either side of the neutral surface 16. Also, the layers which are inversely symmetrical at one side and the other side of the neutral surface 16 are four fiber bundle layers having a fiber orientation angle of +θ and four fiber bundle layers having a fiber orientation angle of −θ, totally eight layers. Also, the respective fiber bundle layers are laminated in the order of from +θ to −θ in a direction apart from the neutral surface 16 at one side (left side in FIG. 1(c)) of the neutral surface 16. On the one hand, the respective fiber bundle layers are laminated in the order of from −θ to +θ in a direction apart from the neutral surface 16 at the other side of the neutral surface 16. Also, the number of other fiber bundle layers disposed between the +θ and −θ layers at either side of the neutral surface 16 is the same.

The laminated structures of the respective fiber bundle layers include a symmetrical structure, an inversely symmetrical structure and an asymmetrical structure with respect to a lamination neutral surface as the border. In the symmetrical structure, the bending and torsion occurring in the fiber-reinforced composite material are not increased so much as to affect the physical properties of the fiber-reinforced composite material. In the asymmetrical structure, the bending and torsion occurring in the fiber-reinforced composite material are increased and thus may affect the physical properties of the fiber-reinforced composite material. Also, in the inversely symmetrical structure, bending is not increased, but torsion is increased, thereby affecting the physical properties of the fiber-reinforced composite material in some cases. However, even in the inversely symmetrical structure, the above conditions are satisfied, so that both of bending and torsion are not increased so much as to affect the physical properties of the fiber-reinforced composite material.

The reason for this is considered to be as follows. When the torsional moment by inversely symmetrical lamination is considered, the torsional moment is proportional to the distance between the +θ and –θ layers. That is, the torsional moment is proportional to the number of fiber bundle layers existing between the +θ and –θ layers. The torsional moments of one set of +θ and –θ layers, when expressed in ratio, are –1, +3, +5 and –7 from the side close to the neutral surface 16, and the total torsional moment becomes 0.

Figure 2:
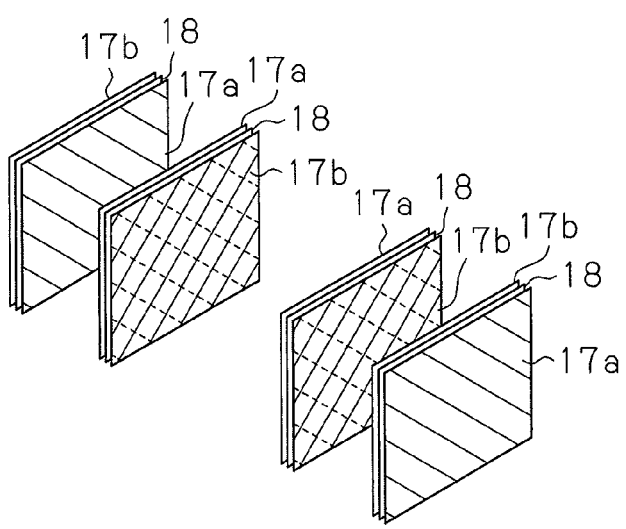
FIG. 2(a) is a perspective view showing the laminated fiber bundle layer in the web part.
FIG. 2(b) is a perspective view showing the web part in the state where all of fiber bundle layers are laminated.
Figure 2:
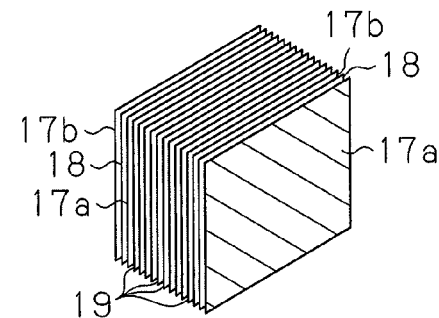

As shown in FIG. 2(*a*), the web part 13 is composed of four sets of laminated fiber bundle layers consisting of a fiber bundle layer 17*a* having a fiber orientation angle of –45°, a fiber bundle layer 17*b* having a fiber orientation angle of +45° and a fiber bundle layer 18 having a fiber orientation angle of 90° sandwiched between the fiber bundle layers 17*a* and 17*b*. Two of the four sets of laminated fiber bundle layers are disposed in the state where the fiber bundle layer 17*a* having a fiber orientation angle of –45° faces the neutral surface 16, and the other two sets are disposed in the state where the fiber bundle layer 17*b* having a fiber orientation angle of +45° faces the neutral surface 16. In this state, fiber bundle layers 19 having a fiber orientation angle of 0° are disposed and laminated between the two laminated fiber bundle layers, thereby obtaining a quasi-isotropic laminated fiber bundle layer as shown in FIG. 2(*b*). In this case, two fiber bundle layers 19 having a fiber orientation angle of 0° are disposed in a position facing the neutral surface 16.

If the fiber orientation angles of the fiber bundle layers disposed on the upper surfaces of the laminated fiber bundle layers 15*a*, 15*b* are defined as the same, the fiber orientation angles of the fiber bundle layers disposed on the respective opposite surfaces of the laminated fiber bundle layers 15*a*, 15*b* constituting the web part 14*a* are inverted. However, whether the fiber orientation angles of the fiber bundle layers disposed on the opposite surfaces of the laminated fiber bundle layers 15*a*, 15*b* are inverted or the same, the total torsional moment based on the respective fiber bundle layers of the laminated fiber bundle layers 15*a*, 15*b* disposed at both sides of the opposite surfaces becomes 0. As a result, the torsion in the fiber-reinforced composite material is reduced.

All of the fiber bundle layers are composed of unidirectional fabrics. In the unidirectional fabrics, the warp yarn functions as reinforced fibers, and the weft yarn functions to keep the array of the warp yarn, but does not function as reinforced fibers. Examples of the unidirectional fabrics include a fabric, such as a cord fabric, in which the array pitch of the weft yarn is extremely greater than that of the warp yarn. Also, the unidirectional fabrics include a fabric having weft yarn which is much finer than warp yarn and has much smaller tensile strength than that of the warp yarn. Specifically, a carbon fiber bundle is used in the warp yarn, and organic fibers are used in the weft yarn.

A fiber-reinforced composite material is produced by impregnating the above-described laminated fiber bundle layer with a resin, and hardening the resin. For example, a resin transfer molding (RTM) method is employed for impregnation and hardening of the resin. In the RTM method, a laminated fiber bundle layer is firstly disposed within a resin impregnating mold. Subsequently, a liquid thermosetting resin is injected into the mold. Then, the thermosetting resin disposed within the mold is heated and hardened to obtain a fiber-reinforced composite material. An epoxy resin is used as the thermosetting resin.

According to the first embodiment, the advantageous effects indicated below can be obtained.

(1) The fiber-reinforced composite material 11 is constructed by laminating a plurality of fiber bundle layers formed of reinforced fibers to form a laminated fiber bundle layer, and further impregnating the laminated fiber bundle layer with a matrix. Also, at either side of the standard surface (neutral surface 16), the number of fiber bundle layers which have a fiber orientation angle of +θ (+θ layers) and the number of fiber bundle layers which have a fiber orientation angle of –θ (–θ layers) are the same. Further, the order of laminating the fiber bundle layers is inversely symmetrical with respect to the standard surface, and the number of other fiber bundle layers disposed between the +θ and –θ layers at either side of the standard surface is also the same. According to this configuration, the warpage of the fiber-reinforced composite material 11 can be reduced without carrying out any special production process even in the case of the fiber-reinforced composite material 11 having a complicated form such as a skin-web structure. Specifically, it is unnecessary to make a mold in expectation of warpage or deformation, to correct warpage by reheating and compression after molding, or to make a fabric from fibers having different torsional moments.

(2) The numbers of +θ layers and –θ layers existing at either side of the standard surface (neutral surface 16) are respectively two. Specifically, two –θ layers are disposed between two +θ layers at one side of the standard surface, and two +θ layers are disposed between two –θ layers at the other side thereof. According to this configuration, it is hard to mistake the order of laminating the +θ layers and –θ layers when laminating the fiber bundle layers.

(3) The laminated fiber bundle layer constitutes the reinforced fibers of the fiber-reinforced composite material 11. Also, the laminated fiber bundle layer comprises a fiber bundle layer having a fiber orientation angle of +θ and a fiber bundle layer having a fiber orientation angle of –θ. In this case, θ is 45°. According to this configuration, fiber bundle layers having a fiber orientation angle of 0° or 90° are used in addition to fiber bundle layers having a fiber orientation angle of +45° or –45°. Due to this, a quasi-isotropic fiber-reinforced composite material can be easily formed.

(4) All the fiber bundle layers constituting a quasi-isotropic laminated fiber bundle layer are composed of a unidirectional fabric. Here, the quasi-isotropic fiber-reinforced composite material 11 is produced by using fiber bundle layers having a fiber orientation angle of 0° or 90° in addition to fiber bundle layers having a fiber orientation angle of +45° or –45°. In this case, the warp yarn group and weft yarn group of common plain weave fabrics can be used in place of the fiber bundle layers having a fiber orientation angle of 0° or 90°. However, when the warp yarn group and weft yarn group of plain weave fabrics are used in place of the fiber bundle layers, the reinforced fibers bend at the crossing parts in an increased proportion. However, all the fiber bundle layers are composed of unidirectional fabrics, so that the reinforced fibers bend at the crossing parts in a reduced proportion. Therefore, the physical properties of the finally-obtained fiber-reinforced composite material 11 improve.

(5) When components made of a fiber-reinforced composite material are used, there is the case where a component 20*a* made of the fiber-reinforced composite material and another structural member 20*b* are fastened using a bolt 21 and a nut 22, as shown in FIG. 3(*a*) and FIG. 3(*b*). At that time, when the component 20*a* which is warped is fastened as it is, the residual stress is caused, resulting in deteriorated strength of the component 20*a*. This residual stress depends on the magnitude of the displacement of the component 20*a* before and after fastening. Therefore, a shim 23 shown in FIG. 3(*b*) may be used for the purpose of relaxing the residual stress of the component 20*a* made of the fiber-reinforced composite material. Specifically, the shim 23 may be used to adjust the height of a joint part between the component 20*a* and the structural member 20*b*. However, according to the first embodiment, the fiber-reinforced composite material 11 is not warped, or slightly warped. Accordingly, the adjustment step using the shim 23 becomes unnecessary, as shown in FIG. 3(*a*).

(6) An inversely symmetrical layer is permitted as the quasi-isotropic laminated fiber bundle layer. Therefore, the degree of freedom of design improves when fiber-reinforced composite material products are laminated.

Second Embodiment

Next, a second embodiment in which the present invention has been embodied will be explained in accordance with FIG. 4(*a*) to FIG. 4(*d*). The second embodiment is different from the first embodiment in that a plurality of reinforcing parts 14 are not entirely structurally identical, and are alternately different. Accordingly, the same symbols are added to the same portions as in the first embodiment for omission of detailed explanations.

The weight and plate thickness of the fiber-reinforced composite material may be restricted. Therefore, the inversely symmetrical laminated structure in the first embodiment cannot be employed as the laminated structure of a web part 13 in some cases. In this case, when the reinforcing parts 14 constituting all the web parts 13 have the same structure, as shown in FIG. 4(*c*), the torsional moments of the same phase generated in the respective web parts 13 (web parts 14*a*) are added so that the displacement of the skin part 12 as a whole becomes great. However, in the second embodiment, a plurality of reinforcing parts 14 are formed so that the torsional moments generated in the adjacent web parts 13 are opposite in phase.

Particularly, the reinforcing parts 14 are formed to generate right-hand torsional moment in a web part 13 designated by R and left-hand torsional moment in a web part 13 designated by L, as shown in FIG. 4(*a*). For example, as shown in FIG. 4(*d*), in the case of the web part 13 designated by R, in the fiber bundle layers disposed at one side of a neutral surface (left side in FIG. 4(*d*)), the fiber orientation angles are set to be 0°, −45°, 90° and +45°, respectively, in order from the neutral surface. Also, in the fiber bundle layers disposed at the other side of the neutral surface (right side in FIG. 4(*d*)), the fiber orientation angles are set to be 0°, +45°, 90° and −45°, respectively, in order from the neutral surface. Further, in the case of the web part 13 designated by L, in the fiber bundle layers disposed at the left side in FIG. 4(*d*), the fiber orientation angles are set to be 0°, +45°, 90° and −45°, respectively, in order from the neutral surface. Also, in the fiber bundle layers disposed at the right side in FIG. 4(*d*), the fiber orientation angles are set to be 0°, −45°, 90° and +45°, respectively, in order from the neutral surface. According to this configuration, the torsional moments generated in the adjacent web parts 13 can be made opposite in phase. In this case, the deformation by the torsional moments generated in the respective web parts 13 would not be added. Therefore, the skin part 12 is deformed into a small wavy form, as shown in FIG. 4(*b*). In the meantime, FIG. 4(*b*) and FIG. 4(*c*) show the deformation of the skin part 12 in an exaggerated fashion.

According to the second embodiment, the following advantageous effects can be obtained.

(7) The inversely symmetrical laminated structure in the first embodiment cannot be employed in some cases, for example, due to the restrictions on the weight and plate thickness required of the fiber-reinforced composite material. However, in the second embodiment, the plurality of reinforcing parts 14 are formed so that the torsional moments generated in the adjacent web parts 13 are opposite in phase. According to this configuration, even if torsional moments are generated in the respective web parts 13, the torsional moment of the same phase generated in all the web parts 13 would not be added. Accordingly, the deformation of the skin part 12 as a whole can be made smaller than that in the case where the torsional moment of the same phase is added. Also, when the fiber-reinforced composite material 11 is fastened with another structural member, the reduction in strength due to the residual stress can be suppressed without adjustment by means of a shim.

For example, the first and second embodiments may be changed as follows.

Figure 5:
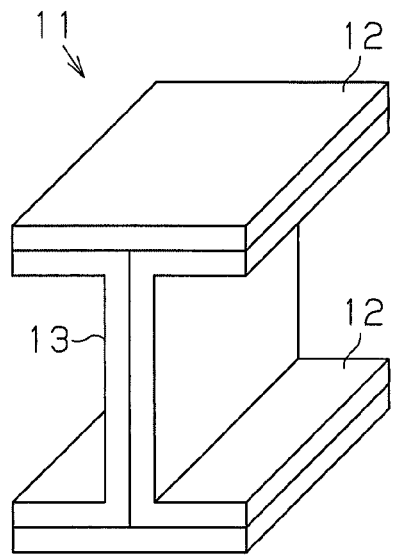
FIG. 5 is a perspective view showing a fiber-reinforced composite material according to another embodiment.
Figure 6:
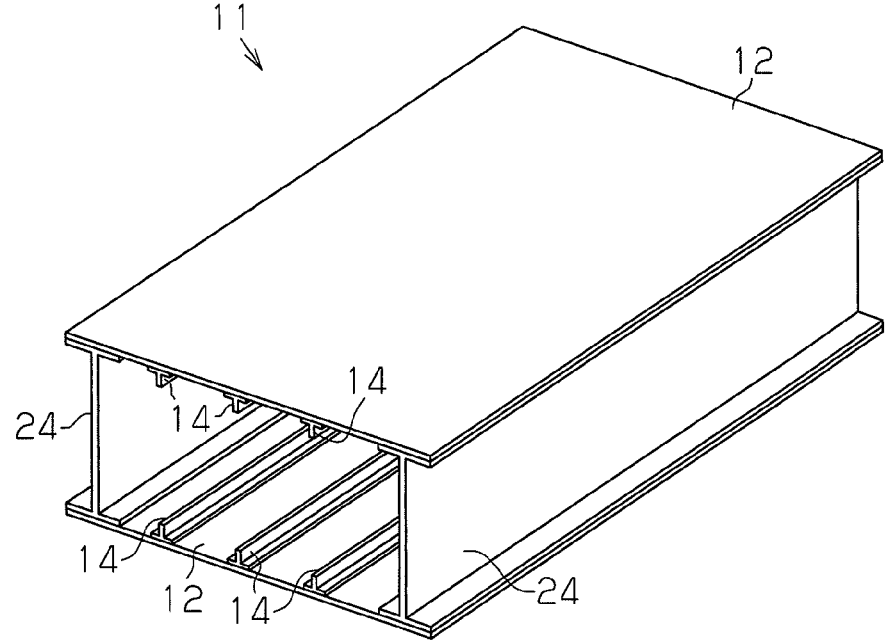
FIG. 6 is a perspective view showing a fiber-reinforced composite material according to another embodiment.

The fiber-reinforced composite material 11 may be in an I-shape having a skin part (flange part) 12 at either side of one web part 13, as shown in FIG. 5. Also, the fiber-reinforced composite material 11 may be in a form comprising two skin parts 12 disposed in parallel and I-shaped connecting parts 24 between the end sides of the two skin parts 12, as shown in FIG. 6. In this case, the two skin parts 12 are each disposed so that the plurality of reinforcing parts 14 are opposite. Also, in this case, the reinforcing parts 14 are not integrated with the skin part 12, but the fiber-reinforced composite material used singly may be formed into a T-shape.

The fiber-reinforced composite material may be formed into a flat plate shape, an L-shape obtained by bending a flat plate or a channel-like shape (U-shape).

As regards the combination of the fiber bundle layers having a fiber orientation angle of +θ and the fiber bundle layers having a fiber orientation angle of −θ, θ may be 60°. In this case, employed are four sets of laminated fiber bundle layers formed by laminating, at 60° pitches, three fiber bundle layers, i.e., a fiber bundle layer having a fiber orientation angle of +60°, a fiber bundle layer having a fiber orientation angle of −60° and a fiber bundle layer having a fiber orientation angle of 0° sandwiched therebetween. In the meantime, FIG. 7(*a*) shows four sets of laminated fiber bundle layers formed by laminating, at 60° pitches, four fiber bundle layers, i.e., laminated fiber bundle layers including a fiber bundle layer having a fiber orientation angle of 0° in addition to the above-described three fiber bundle layers.

Figure 7A:
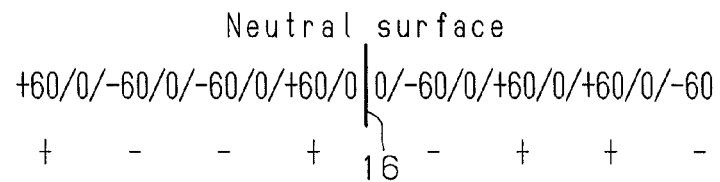
FIGS. 7(a) and (b) are schematic diagrams showing the laminated configuration of laminated fiber bundle layers according to another embodiment.
Figure 7B:
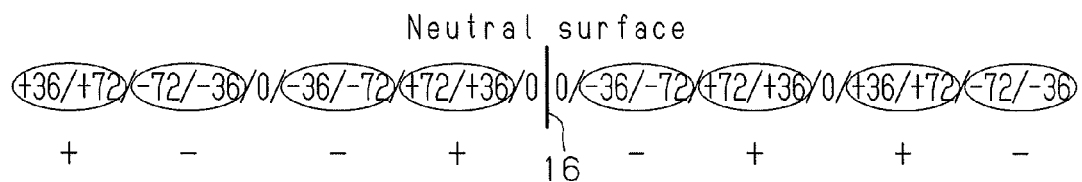
Figure 8A:
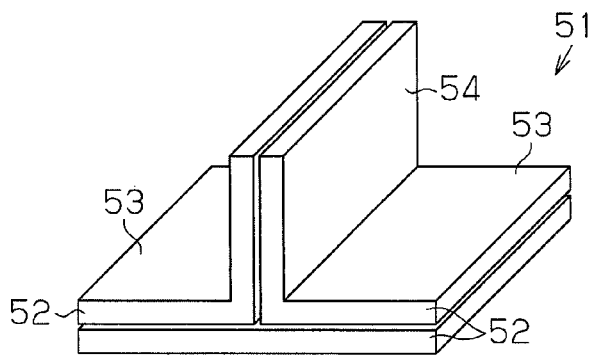
FIG. 8(a) is a perspective view showing a conventional fiber-reinforced composite material having a skin-web structure.
Figure 8B:
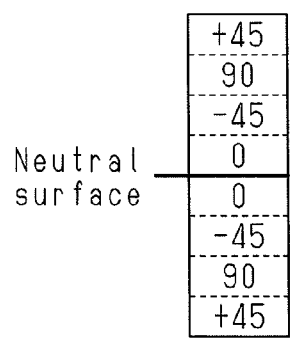
FIG. 8(b) is a schematic diagram showing the laminated configuration of symmetrical laminated sheets.
Figure 8C:
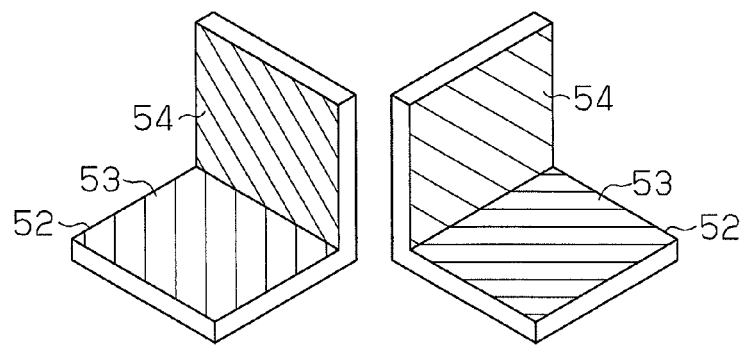
FIG. 8(c) is a schematic diagram showing the difference in symbols between layers having a fiber orientation angle of 45° in the web parts of the symmetrical laminated sheets disposed on the right and left sides.

A fiber bundle layer having a fiber orientation angle of +θ may be composed of one set of two layers, i.e., a fiber bundle layer having a fiber orientation angle of +36° and a fiber bundle layer having a fiber orientation angle of +72°, and a fiber bundle layer having a fiber orientation angle of −θ may be composed of one set of two layers, i.e., a fiber bundle layer having a fiber orientation angle of −36° and a fiber bundle layer having a fiber orientation angle of −72°. For example, as shown in FIG. 7(*b*), a quasi-isotropic laminated fiber bundle layer is composed of five fiber bundle layers (additionally including a fiber bundle layer having a fiber orientation angle of 0°) laminated at 36° pitches as one unit. According to this configuration, two units can be disposed at either side of the neutral surface, thereby constituting a quasi-isotropic laminated fiber bundle layer having an inversely symmetrical structure. Also, in this case, when a fiber bundle layer having a fiber orientation angle of +36° and a fiber bundle layer having a fiber orientation angle of +72° are collectively considered as +θ fiber bundle layers, and a fiber bundle layer having a fiber orientation angle of −36° and a fiber bundle layer having a fiber orientation angle of −72° are collectively considered as −θ fiber bundle layers, as shown with ellipses shown in FIG. 7(*b*), the configuration is similar to that of the invention as claimed in claim 1. Thus, even in the case of the fiber-reinforced composite material 11 having a complicated form such as a skin-web structure, the warpage of the fiber-reinforced composite material 11 can be reduced without carrying out any special production process. Specifically, it is unnecessary to make a mold in expectation of warpage or deformation, to correct warpage by reheating and compression after molding, or to make a fabric from fibers having different torsional moments.

It is unnecessary to dispose a fiber bundle layer having a fiber orientation angle of 0° as a fiber bundle layer adjacent to the neutral surface 16. In this case, a fiber bundle layer having a fiber orientation angle of 90° may be disposed in place of the fiber bundle layer having a fiber orientation angle of 0°. Also, a fiber bundle layer having a fiber orientation angle of +θ and a fiber bundle layer having a fiber orientation angle of −θ may be each disposed to be adjacent to the neutral surface 16.

The fiber-reinforced composite material 11 may not have quasi-isotropy as a whole. For example, when the fiber-reinforced composite material 11 is constructed in the first embodiment, it is possible to reduce the number of fiber bundle layers having a fiber orientation angle of 0° or eliminate such fiber bundle layers, or to reduce the number of fiber bundle layers having a fiber orientation angle of 90°. In this case, the warpage of the fiber-reinforced composite material 11 can be reduced, if the number of +θ layers which are fiber bundle layers having a fiber orientation angle of +θ and the number of −θ layers which are fiber bundle layers having a fiber orientation angle of −θ are the same at one side of the standard surface, the order of laminating the fiber bundle layers is inversely symmetrical with respect to the standard surface, and the number of other fiber bundle layers disposed between the +θ and −θ layers at either side of the standard surface is the same.

The position where the fiber bundle layer having a fiber orientation angle of 0° is disposed and the position where the fiber bundle layer having a fiber orientation angle of 90° is disposed may be exchanged.

The number of other fiber bundle layers disposed between the +θ and −θ layers at either side of the standard surface, i.e., fiber bundle layers having a fiber orientation angle of 0° or fiber bundle layers having a fiber orientation angle of 90° may be two or more. Also, both of fiber bundle layers having a fiber orientation angle of 0° or 90° may be disposed between the +θ and θ layers.

The quasi-isotropic fiber-reinforced composite material 11 is sometimes produced using fiber bundle layers having a fiber orientation angle of 0° or 90° in addition to fiber bundle layers having a fiber orientation angle of +45° or −45°. In this case, the warp yarn group and weft yarn group of common plain weave fabrics or twill fabrics may be used in place of the fiber bundle layers having a fiber orientation angle of 0° or 90°, without constructing all the fiber bundle layers from unidirectional fabrics. When the warp yarn group and weft yarn group of plain weave fabrics are used in place of the fiber bundle layers having a fiber orientation angle of 0° or 90°, the reinforced fibers bend at the crossing parts in an increased proportion. Therefore, the configuration in which all the fiber bundle layers are composed of unidirectional fabrics provides more improved physical properties of the finally-obtained fiber-reinforced composite material 11. However, when the warp yarn group and weft yarn group of common plain weave fabrics are used in place of the fiber bundle layers having a fiber orientation angle of 0° or 90°, the number of steps related to the operation of disposing fiber bundle layers is reduced. Also, the cost for production can be reduced since commercial carbon fiber fabrics can be utilized in the fiber bundle layers.

Laminated fiber bundle layers bound to each other with stitching yarn arrayed in the thickness direction may be used as the laminated fiber bundle layer. In this case, when a fiber-reinforced composite material having a shape other than a flat plate is produced by the RTM method, a preformed molded body may be disposed within a mold after forming a laminated fiber bundle layer into a target shape outside the mold.

The method for producing a fiber-reinforced composite material is not limited to the RTM method. For example, a fiber-reinforced composite material may be produced by impregnating fiber bundles arrayed in one direction with a thermosetting resin to form a plurality of prepregs in a semi-hardened state, laminating the plurality of prepregs to form a laminated fiber bundle layer, and heating and pressurizing the laminated fiber bundle layer disposed within the mold.

When the fiber-reinforced composite material 11 having a skin-web structure is produced, the flat-plate like skin part 12 and reinforcing parts 14 integrated on the skin part 12 and having an inverted T-cross section may be produced at the same time. Also, after separate production of the skin part 12 and reinforcing parts 14, the reinforcing parts 14 may be integrated with the skin part 12. In this case, fastening tools such as an adhesive, and a bolt and a nut may be used for fixation between the skin part 12 and the reinforcing parts 14.

The fiber-reinforced composite material may be used in other structural materials, not limited to structural materials for aircraft.

The thermosetting resin constituting the matrix resin of the fiber-reinforced composite material may be, in addition to epoxy resins, unsaturated polyester resins and phenol resins. However, in the case where an epoxy resin is used, a fiber-reinforced composite material which satisfies target mechanical physical properties and heat resistance can be easily produced if carbon fibers are used as the reinforced fibers.

In addition to carbon fibers, high-strength organic fibers such as aramid fibers, poly-p-phenylene benzobisoxazole fibers and ultrahigh molecular weight polyethylene fibers and inorganic fibers such as glass fibers and ceramic fibers may be used as fiber bundles constituting the reinforced fibers.

The matrix of the fiber-reinforced composite material is not limited to a fiber-reinforcing resin, and may be any material other than the resins. Especially in the case where heat resistance is required, a carbon/carbon composite material obtained by calcining a fiber-reinforcing resin having carbon fibers as reinforced fibers to carbonize the resin may be used.

The invention claimed is:

1. A fiber-reinforced composite material constructed by impregnating a laminated fiber bundle layer formed by laminating a plurality of fiber bundle layers formed of reinforced fibers with a matrix, wherein the reinforced fibers comprise +θ layers that are fiber bundle layers having a fiber orientation angle of +θ, −θ layers that are fiber bundle layers having a fiber orientation angle of −θ, and other fiber bundle layers, wherein, on each side of a standard surface, the number of +θ layers and the number of −θ layers are the same, wherein the order of laminating the fiber bundle layers is inversely symmetrical with respect to the standard surface, and wherein the number of other fiber bundle layers disposed between the +θ and −θ layers at either side of the standard surface is the same.

2. The fiber-reinforced composite material according to claim 1, wherein the numbers of the +θ layers and −θ layers existing on each side of the standard surface are respectively two, and wherein, as the order of laminating the fiber bundle layers, the two −θ layers are disposed between the two +θ layers at one side of the standard surface, and the two +θ layers are disposed between the two −θ layers at the other side.

3. The fiber-reinforced composite material according to claim 1, wherein θ is 45°.

4. The fiber-reinforced composite material according to claim 1,
wherein the +θ layers constitute one pair of two layers, and
wherein the −θ layers constitute one pair of two layers.

5. The fiber-reinforced composite material according to claim 1, wherein the fiber-reinforced composite material constitutes a structure having a flat-plate like skin and one or more webs extending vertically to the skin.

6. The fiber-reinforced composite material according to claim 1, wherein the fiber bundle layers are composed of a unidirectional fabric.

7. The fiber-reinforced composite material according to claim 3,
wherein the other fiber bundle layers are fiber bundle layers having a fiber orientation angle of 0° or 90°, and
wherein the fiber bundle layers having a fiber orientation angle of 0° or 90° are composed of a plain weave fabric or twill fabric.

8. The fiber-reinforced composite material according to claim 4,
wherein the +θ layers is a fiber bundle layer having a fiber orientation angle of +36° and a fiber bundle layer having a fiber orientation angle of +72°, and
wherein the −θ layers is a fiber bundle layer having a fiber orientation angle of −36° and a fiber bundle layer having a fiber orientation angle of −72°.

* * * * *